3,195,180
MOULDING ARTICLES
Ernest T. Jagger and Edward I. Hunter, Newcastle upon Tyne, England, assignors to George Angus & Company Limited, Newcastle, England
Filed Apr. 18, 1962, Ser. No. 188,415
Claims priority, application Great Britain, Apr. 24, 1961, 14,713/61
5 Claims. (Cl. 18—5)

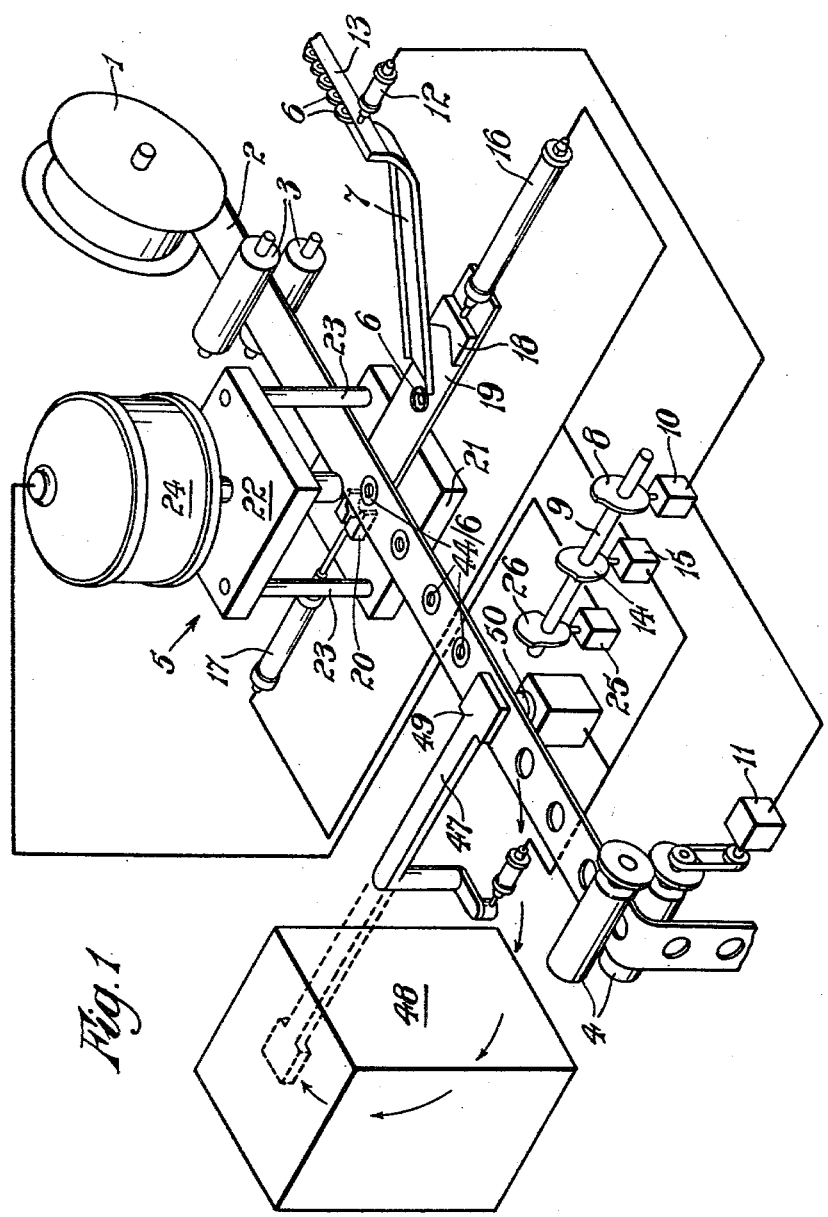

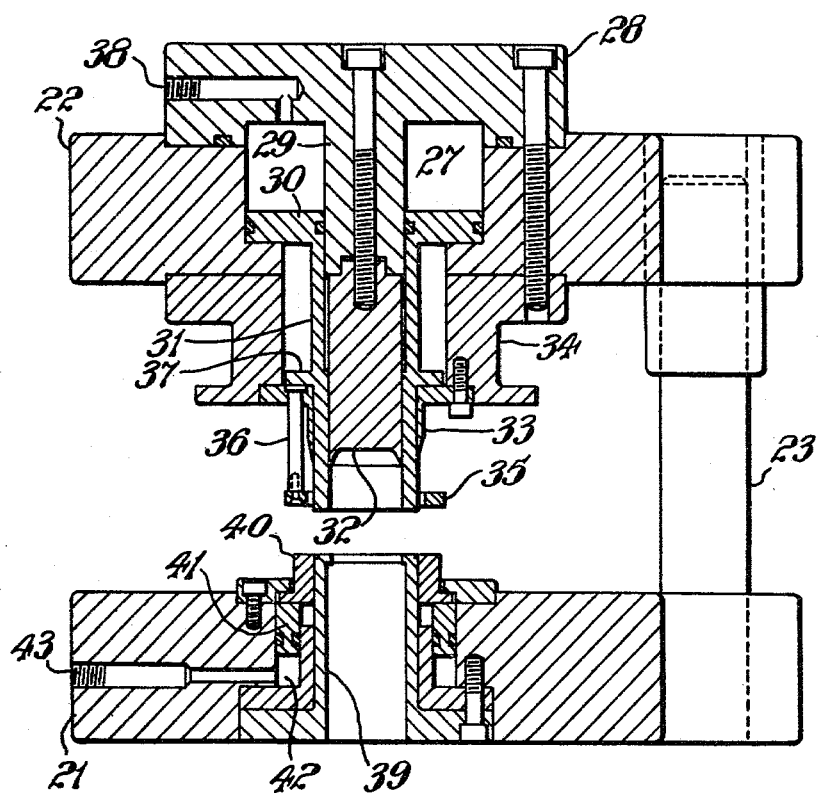

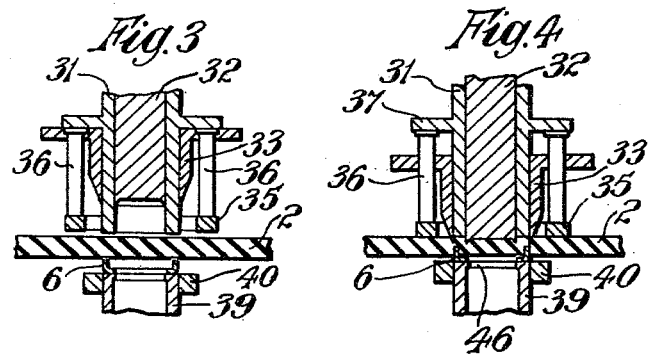
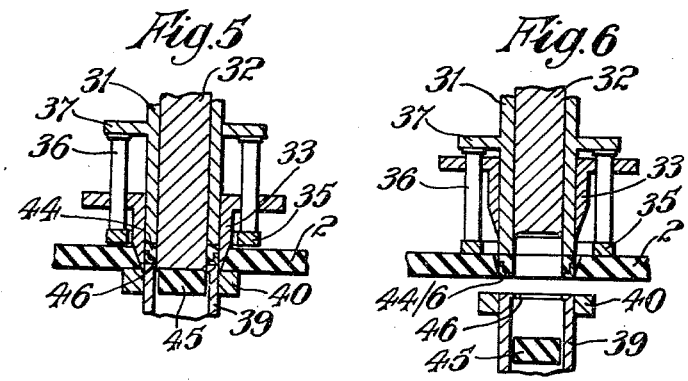

This invention relates to moulding articles from rubber or like material with a preformed component incorporated in the moulding of each article.

The invention has been developed for, and will be described as applied to, the moulding of rubber rings which each have a metal ring embedded in the rubber as a stiffening insert and are used as fluid sealing or packing rings around shafts in machinery. Such metal-insert rubber rings are known as oil seals and the rubber is usually an oil-resistant synthetic rubber.

The primary object in the development of the present invention has been to provide improved methods of manufacturing metal-insert rubber oil seals which will enable automatic mechanism to effect operations which have previously been done by hand. It will be apparent that the same methods are applicable to the automatic production of other articles moulded from plastic material and incorporating preformed components.

By "plastic material" is meant material which is in a plastic condition, like an unvulcanised rubber composition, and from which blanks can be cut for moulding into articles.

The plastic material used in the present invention is in strip form, in particular a long strip of unvulcanized rubber composition produced by a roller mill or an extruder, and the invention enables blanks to be cut from the plastic material and assembled each with a preformed component to form mouldable composite units for delivery to moulding apparatus such as a press.

For the above purpose, the invention provides a method of assembling plastic material with a preformed component to be united therewith by moulding, which comprises juxtaposing a preformed component and plastic material in strip form, blanking the plastic material in register with the preformed component and pressing the blanked plastic material and preformed component together to form a composite unit.

The invention further provides a method of forming and conveying composite units each consisting of plastic material with a preformed component to be united therewith by moulding, comprising moving plastic material in strip form longitudinally of the strip form, juxtaposing preformed components with less than full-width portions of the plastic material in strip form, blanking plastic material in register with each preformed component, pressing the blanked plastic material and preformed components respectively together to form composite units and entraining the composite units in movement of the plastic material remaining in strip form after blanking.

Further features of the invention and an example of the way in which the invention can be put into effect will now be described with reference to the accompanying drawings, in which:

FIG. 1 is a schematic perspective view of mechanism for feeding inserts to a strip of plastic rubber and forming therefrom composite rubber blanks and insert units for delivery to a moulding machine.

FIG. 2 is an axial section through mechanism for cutting blanks, assembling them each with an insert and locating them in the apertured strip to be conveyed thereby, and FIGS. 3 to 6 are somewhat diagrammatic fragmentary axial sections showing successive stages in the operation of the mechanism of FIG. 2.

In FIG. 1 there is shown a reel 1 holding a wound stock of plastic rubber composition in the form of a long strip 2 which is led between two pairs of feed rollers 3 and 4 which are driven intermittently so as to feed the strip 2, held tautly between them, step-by-step in the intervals between successive operations of mechanism, generally indicated as 5, for cutting ring blanks from the plastic rubber and assembling each blank with an L-section metal ring insert 6 delivered by a chute 7.

The step-by-step movement of the strip 2 and the synchronised delivery of inserts 6 are timed by a cam 8, on a master cam-shaft 9, operating a switch 10 which controls drives for the feed-rollers, of which only a drive 11 for the rollers 4 is shown, and a gate mechanism 12 which passes inserts 6 one-by-one from a magazine 13. Suitable mechanisms, for example pneumatic or electric mechanisms, are well-known and commercially available for effecting such operations. They are therefore shown only diagrammatically and need not be described in detail.

The cam-shaft 9 has another cam 14 which controls, through a switch 15, reciprocation of a pair of pneumatic rams 16 and 17 which respectively move a push-fork 18, to slide each insert 6 in turn along a table 19, and locating fingers 20 which receive each insert 6 and position it below the strip 2 for assembly with a ring blank cut from the strip 2 by the mechanism 5.

The mechanism 5, shown by FIG. 2, comprises a lower bolster 21, which is fixed on a base (not shown), and an upper bolster 22 which is mounted to slide vertically on guide pillars 23 and forms the head of a pneumatic press 24 so that the upper bolster 22 is moved down towards and up from the lower bolster 21 in a timed sequence controlled by a switch 25 and a cam 26 on the cam-shaft 9.

Within the upper bolster 22, a cylinder 27 is closed and made annular by a head 28 having a stem 29 which forms a central guide for an annular piston 30 with a tubular rod 31.

On the lower end of the stem 29 there is mounted a cylindrical plunger knife 32 and around the lower end of the piston rod 31 there is mounted as a sleeve a ring knife 33 fixed to a mounting ring 34 which surrounds the piston rod 31 with a clearance and is fixed to the underside of the upper bolster 22.

A top stripper ring 35, which surrounds the piston rod 31 with a clearance sufficient to pass the ring knife 33, is suspended from the mounting flange of the ring knife 33 by freely sliding pins 36 so that the stripper ring 35 always tends to drop into the position shown in FIG. 2 but can lift relatively to the ring knife 33 so far as is allowed by abutment of the heads of its suspension pins 36 against a collar 37 on the piston rod 31.

In the cylinder head 28 there is a port 38 for the admission and exhaust of compressed air for the cylinder 27 and controlled with or by the reciprocation of the upper bolster 22.

In the lower bolster 21, a tubular pommel 39 is mounted fast coaxially for the knives 32 and 33 respectively to shear inside and outside the pommel 39 to cut a ring blank of rubber from the strip 2.

Mounted to slide vertically on the pommel 39 is a bottom stripper ring 40 supported by an annular piston 41 in a cylinder 42 to which a port 43 leads through the bolster 21 from a compressed air reservoir (not shown). The bottom stripper ring 40 is therefore constantly resiliently urged upwardly, as though by a compression spring, but with a force which can be adjusted by suitable setting of the reservoir air pressure.

The operation of the mechanism 5 described above is shown sequentially by FIGS. 3 to 6.

FIG. 3 shows the position when the upper bolster is raised, an insert 6, which has been located by the fingers 20, is in position coaxially on the pommel 39 and the strip 2 is stationary above the insert 6.

FIG. 4 shows the position after commencement of the down-stroke of the upper bolster 22. The knives 32 and 33 move down, with the bolster 22, to cut into the strip 2 but the cylinder 27 is not under pressure and the piston rod 31 and upper stripper ring 35 merely rest by their own weight on the upper surface of the strip 2. The strip 2 is however, by the knives 32 and 33, also thrust on to the axial flange of the L-section insert 6 which is relatively sharp and cuts into the strip.

FIG. 5 shows the position on completion of the down-stroke of the upper bolster 22, the knives 32 and 33 having cut from the strip 2 a ring blank 44 in which is embedded the insert 6. A core 45, cut from the middle of the blank 44, has been thrust by the plunger knife 32 into the tubular pommel 39 the bore of which is enlarged beyond a slight inward flange 46 at its mouth. The core 45 is thus free to drop from the plunger knife 32 but, failing this, is stripped therefrom by the flange 46 when the plunger knife is subsequently raised.

At the stage of FIG. 5, the cylinder 27 is placed under pressure of compressed air, supplied through the port 38, and the piston 30 is thereby loaded downwardly for the piston rod 31 to exert pressure on the blank 44 and cause it to flow, within the annular confines of the opposed cylindrical surfaces of the knives 32 and 33 and the top of the pommel 39, so as to ensure complete mating of the blank 44 with the insert 6 to form a composite unit. The lower stripper ring 40 has yielded downwardly to allow the knives to pass the top of the pommel.

FIG. 6 shows the position after the return, upward, stroke of the upper bolster 22, the cylinder 27 having been maintained under pressure to load the piston 30, with its rod 31 and collar 37, downwardly. The lower stripper ring 40, under the thrust of its supporting piston, has stripped the apertured strip 2 from the pommel 39, the knives 32 and 33, in moving upwardly with the bolster 22, have entrained in their upward movement the apertured strip 2 as well as the composite blank unit 44/6, this being promoted by the tacky and slightly resilient nature of the rubber composition, but the piston rod 31 and upper stripper ring 35, loaded relatively downwardly by the air pressure in the cylinder 27, have respectively stripped the blank unit 44/6 and the apertured strip 2 from the knives.

The core 45 falls through the tubular pommel 39 into a receiver for collection, reconstitution and re-use.

The wall of the aperture in the strip 2 formed by cutting of the blank 44 has been placed under some compression by the thickness of the ring knife 33 and the rubber composition has enough resilience to recover slightly from such compression so that, being also tacky, the composite unit 44/6 becomes held in the strip aperture firmly enough to stay in the plane of the strip and be conveyed by the strip when it is moved by the feed rollers to bring a fresh portion of the strip into position for the next cycle of operation of the mechanism 5.

As operation of the mechanism 5 is repeated, a succession of composite units 44/6 is formed and conveyed by the apertured strip 2 to a swinging transfer arm 47 which receives the units one-by-one from the strip and transfers them to a moulding press 48 as indicated in FIG. 1.

The transfer device does not form part of the present invention but, as diagrammatically indicated, the transfer arm 47 may have a unit-receiving chuck 49, for example a suction chuck, a magnetic chuck or a friction socket chuck, into which the unit is thrust upwardly by a plunger 50 and which, after the arm 47 has swung to the moulding machine 48, loads a die therof with the unit. The operation of the transfer device is controlled in synchronism with the other operations, for example by the switch 15.

Modifications may of course be made in the apparatus shown schematically by FIG. 1 and described above. For example, the reel 1 could be replaced by an extruder or a roller mill with strip cutting means, as is known, for continuous formation of the strip 2. The mechanism 5 could have multiple tools for forming more than one composite unit at each stroke from a strip of appropriate width. The transfer device could be omitted and the apertured strip could convey the units directly to a moulding machine provided that this is done without bringing the apertured strip into such proximity to a heated part of the machine as to spoil, by partial cure or vulcanization, the suitability of the rubber composition of the apertured strip for reconstitution and re-use.

Although the method of locating composite units in apertures in the strip is a very convenient and effective way of ensuring that the units are entrained in movement of the strip and positioned for subsequent operations, it would be possible merely to deposit the units on the strip, as on a simple conveyor belt, or even to omit a conveying operation, the units after formation being simply removed and collected for subsequent feeding to moulding apparatus by other means, such as a hopper feed.

The invention can of course be applied to forming composite units other than the ring blank and L-section insert units described. For example, metal studs may be united with disc blanks, to be moulded into studs with rubber-covered heads, or preformed washers, of metal or hard plastics, may be united with rubber or elastomeric plastic blanks to be moulded into faced or covered washers.

In the example described, pneumatic mechanisms, such as the press 24 and the rams 16 and 17, are used, but equivalent mechanisms, for example a hydraulic press or electro-mechanical jacks, could be used.

We claim:

1. Apparatus for forming composite units each consisting of plastic material including a stiffening insert embedded therein and for conveying said composite units to moulding apparatus, comprising means for moving plastic material in strip form longitudinally of the strip form, press means in the path of movement of said plastic material, support means in said press means for supporting a stiffening insert delivered thereto in overlapping relationship with plastic material moving in said path, means for delivering separate stiffening inserts successively to said support means and locating each of said inserts, in turn, upon said support means, and blanking means in said press means for coacting with said support to cut blanks from plastic material in register with inserts located on said support.

2. Apparatus according to claim 1 and stripping means around and movable relatively to said blanking means to retain said plastic material and blanks formed therefrom in the same plane after blanking.

3. Apparatus according to claim 2 including means for pressing together each insert and its associated blank subsequent to the cutting of said blank from said plastic material.

4. Apparatus for forming composite units consisting of plastic material including a stiffening insert in the form of a ring embedded therein, including a tubular pommel for supporting a ring coaxially therewith, means for supporting plastic material in strip form in overlapping relationship with said ring when supported upon said pommel, means for delivering said ring to said pommel and locating said ring coaxially upon said pommel, a pair of cylindrical knives coaxial with said pommel, and means for thrusting said pair of cylindrical knives axially against said plastic material to press said plastic material on to said ring and then to shear past said pommel to cut an annular blank coaxial with said pommel from said plastic material.

5. Apparatus according to claim 4 including stripper rings around said pommel and said knives respectively, moveable axially relatively to said knives for maintaining the plastic material apertured during cutting of said blank in the plane of said blank, which blank thus becomes located in an aperture in the plastic material.

References Cited by the Examiner
UNITED STATES PATENTS

| | | | |
|---|---|---|---|
| 789,695 | 5/05 | Kempshall | 264—269 |
| 893,739 | 7/08 | Latham | 264—267 |
| 2,971,249 | 2/61 | Anderson et al. | 18—59 |
| 3,034,172 | 5/62 | Sander | 18—5 |
| 3,047,910 | 8/62 | Downs | 264—153 |
| 3,101,992 | 8/63 | Cooke | 264—153 |
| 3,135,019 | 6/64 | Aichele | 18—5 |

ROBERT F. WHITE, *Primary Examiner.*

MORRIS LIEBMAN, ALEXANDER H. BRODMERKEL, *Examiners.*